United States Patent [19]

Binkley et al.

[11] Patent Number: 4,777,811

[45] Date of Patent: Oct. 18, 1988

[54] CLAMSHELL SECURITY DEVICE

[75] Inventors: Randall E. Binkley, Indianapolis; Stephen F. Shay, Greenwood, both of Ind.

[73] Assignee: Citizens Energy Services Corporation, Indianapolis, Ind.

[21] Appl. No.: 524,579

[22] Filed: Aug. 19, 1983

[51] Int. Cl.[4] .............................................. F16B 41/00
[52] U.S. Cl. ........................................ 70/178; 70/232
[58] Field of Search .................... 70/231, 232, 178–180

[56] References Cited

U.S. PATENT DOCUMENTS

| 7,587 | 4/1849 | Hall. | |
|---|---|---|---|
| 89,930 | 5/1869 | Hall. | |
| 748,720 | 1/1904 | Glazier. | |
| 780,112 | 1/1905 | Maggio. | |
| 3,172,282 | 3/1965 | Heckrotte | 70/232 X |
| 3,245,240 | 4/1966 | DeForrest | 70/232 X |
| 3,540,468 | 11/1970 | Finck, Jr. | 70/178 X |
| 4,024,740 | 5/1977 | DiGiovanni. | |
| 4,062,208 | 12/1977 | Nielsen, Jr.. | |
| 4,326,740 | 4/1982 | Guiler | 292/307 B |

Primary Examiner—Robert Wolfe
Attorney, Agent, or Firm—Barnes & Thornburg

[57] ABSTRACT

A housing is provided for placement over a valve in a line to prevent unauthorized access to the valve. The housing includes first and second shell halves. The first and second shell halves are mateable to form an enclosure for the valve, and to form openings through which the line can pass. Each shell half includes a perimetral lip region, an interior surface, and an exterior surface. A lock-receiving bracket is attached to the interior surface of the first shell. The lock-receiving bracket includes an aperture through which a bolt-type lock can pass. A lock-engaging member is attached to the interior surface of the second shell half. The first shell half includes an access opening for inserting the lock into the enclosure. The lock-receiving bracket is aligned with the lock-engaging bracket to permit the lock to be received by both the lock-receiving bracket and the lock-engaging member when the shell halves are mated to lock the first shell half to the second shell half.

7 Claims, 1 Drawing Sheet

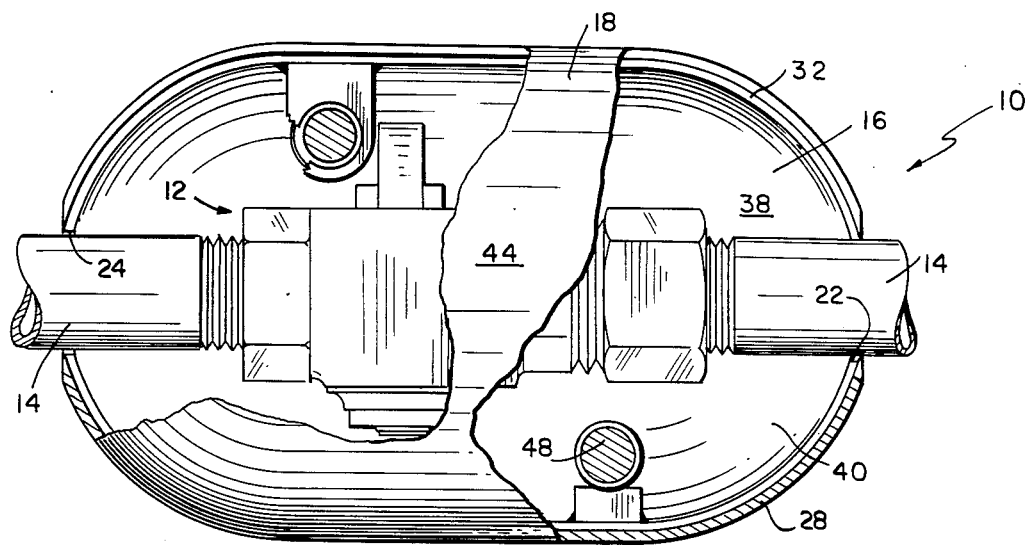
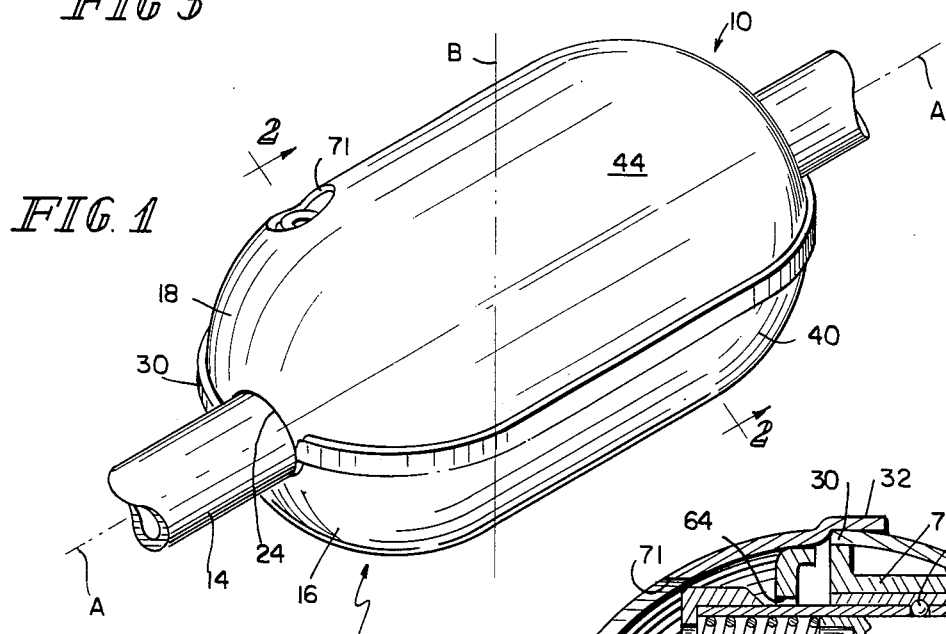
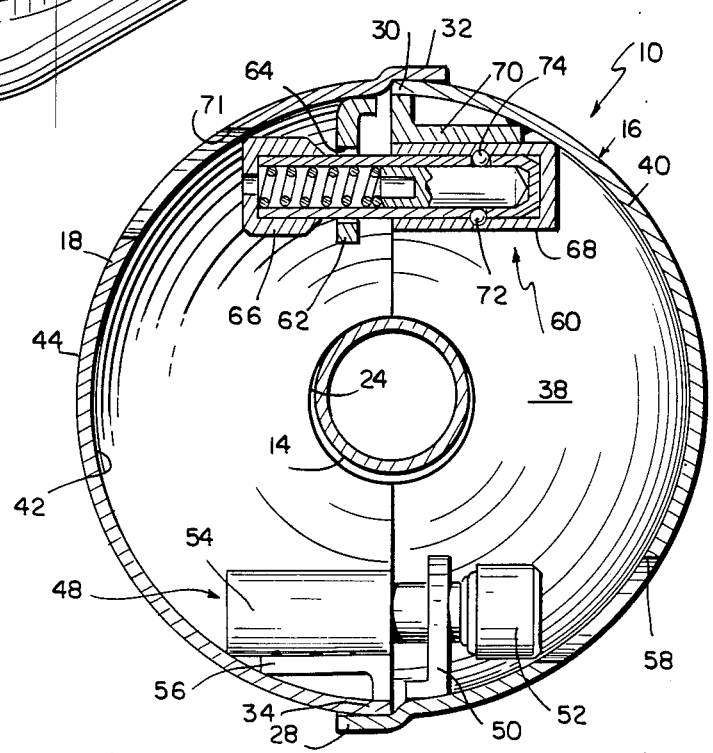

CLAMSHELL SECURITY DEVICE

The present invention relates to security devices, and more particularly to a security device for enclosing a valve in a material supply line, such as a gas supply line, to prevent unauthorized access to the valve.

Material supply lines, such as gas supply lines, usually include one or more valves which regulate the flow of material through the supply line to a customer. There is usually at least one or more valves per customer. By opening the valve, the utility can initiate the flow of material to a customer. Often it is necessary to shut the valve to stop the flow of material to the customer. Such cases often occur in situations where it would be dangerous to continue the flow of the material being supplied, or in cases where the customer has failed to pay for the material supplied.

Devices for locking valves and stopcocks are known. For example, U.S. Pat. Nos. 89,930; 748,720; 780,112; 4,024,740; and Re. 7,587 relate to devices for locking valves and stopcocks which utilize exposed locking mechanisms. One difficulty encountered with the use of exposed locks is that the locks are accessible to those who might wish to cut or saw the lock to disable the lock. If the lock is disabled, unauthorized persons can gain access to the valve to operate the valve. Devices having recessed locks are also known. See, for example, U.S. Pat. Nos. 3,172,282 and 4,062,208.

One object of the present invention is to provide a housing for a valve wherein the lock mechanism is inaccessible to unauthorized persons, thus deterring tampering with the lock and valve.

In accordance with the instant invention, a housing is provided for placement over a valve in a line to prevent unauthorized access to the valve. The housing includes first and second shell halves. The first and second shell halves are mateable to form an enclosure for the valve and an opening for the line. Each shell half includes perimetral lip regions. The lip regions of the first shell half are mateable with the lip regions of the second shell half. Each shell half also includes an interior surface, and an exterior surface. A lock-receiving bracket is connected to the interior surface of the first shell. The lock-receiving bracket includes an aperture for receiving a lock. An access opening is provided in the first shell half for inserting the lock into the lock-receiving bracket. A lock-engaging means is connected to the interior surface of the second shell half for engaging the lock when received in the bracket. The lock-receiving bracket is aligned with the lock-engaging means when the shell halves are mated to permit the lock to be received by both the lock-receiving bracket and the lock-engaging means to lock the first shell half to the second shell half.

In the illustrative embodiment, the perimetral lip regions of each shell half include a flange providing a lip-receiving area for a lip region of the other shell half. Each shell half can comprise a generally elongated bowl-shaped member having a pair of opposed, generally semicircular cut-out portions. When the shell halves are mated, the cut-out portions form a pair of opposed openings through which the line can pass.

One aspect of the instant invention is that the valve is fully enclosed within the housing. By fully enclosing the valve, the valve is inaccessible to unauthorized persons, thus deterring tampering with the valve.

One feature of the instant invention is that the lock used to secure the first shell half to the second shell half is disposed inside the housing. This feature has the advantage of restricting access to the lock, thus making it more difficult for unauthorized persons to disable the lock to obtain access to the valve.

Another feature of the instant invention is that the housing and openings are large enough to permit rotation of the housing about the valve. The rotatability of the housing makes it more difficult for unauthorized persons to apply a force to the housing, such as with a crowbar, to pry the shell halves apart.

Various features and advantages of the invention will become apparent to those skilled in the art upon consideration of the following detailed description of an embodiment of the invention. The detailed description particularly refers to the accompanying drawings in which:

FIG. 1 is a perspective view of a security device embodying the present invention;

FIG. 2 is a cross-sectional view taken generally along lines 2—2 of FIG. 1; and

FIG. 3 is a top view, partly broken away, of the security device shown in FIG. 1.

Referring now to the Figures, a housing 10 is shown for enclosing a valve 12 in a line 14, such as a gas supply line, to prevent unauthorized access to the valve 12. Housing 10 is constructed of a heavy, stamped metal which is thick and strong enough to discourage unauthorized persons from attempting to break or cut through housing 10. Housing 10 includes first 16 and second 18 generally oval, bowl-shaped shell halves. First shell half 16 and second shell half 18 are mateable to form an enclosure for the valve 12 and to provide a pair of openings 22, 24 at opposite ends of the housing 10 through which the line 14 can pass. The openings 22, 24 are formed by generally semicircular cut-out portions at the end of each shell half 16, 18 which, when the shell halves 16, 18 are mated, form the pair of opposed openings 22, 24. As best shown in FIGS. 2 and 3, the housing 10 and openings 22, 24 are large enough to permit the housing 10 to be freely rotated about the valve 12 and line 14 when the two shell halves 16, 18 are locked to each other. This feature makes it difficult for an unauthorized person to apply force to the housing to pry the shell halves apart.

The housing 10 has a longitudinal axis A which extends generally coaxial with line 14 and transverse axis B which is generally perpendicular to the longitudinal axis A. Housing 10 is rotatable about axis A when the shell halves are locked to each other.

First shell half 16 includes perimetral lip regions 28, 30. Likewise, second shell half 18 includes perimetral lip regions 32, 34 for mating with lip regions 28, 30. The lip region 28 of shell half 16 includes a flange 28 providing a lip-receiving area for lip region 34 of shell half 18. Likewise, the lip region 32 of shell half 18 includes a flange 32 providing a lip-receiving area for lip region 30 of shell half 16.

Each shell half 16, 18 also includes an interior surface 38, 42 and an exterior surface 40, 44, respectively. The flanges of lip regions 28, 32 are offset and generally parallel to the exterior surfaces 40, 44 of shell halves 16, 18 to provide the lip-receiving areas. The lip regions 30, 34 are generally co-extensive with the exterior surfaces 40, 44 of shell halves 16, 18. The lip regions 28, 34 extend along one side of the shell halves 16, 18 between the cut-out portions which form openings 22, 24, as best shown in FIG. 2. Lip regions 30, 32 extend along the side of shell halves 16, 18 opposite the lip regions 28, 34, respectively. The flange of lip region 28 of shell half 16 provides an area which is sized and shaped to receive the lip region 34 of second shell half 18. Likewise, the flange of lip region 32 of second shell half 18 provides an area which is sized and shaped to receive the lip region 30 of first shell half 16. When shell halves 16, 18 are separated and placed next to each other, it can be seen that they are mirror images of each other.

A first locking means 48 is disposed in the interior of housing 10. First locking means 48 includes an L-shaped lock bracket 50 which is attached to the interior surface 38 of shell half 16, for example, by welding. Bracket 50 includes an aperture (not shown) therethrough. A bolt-type lock 52 passes through the aperture in bracket 50 and into lock-engaging means 54. Lock-engaging means 54 is attached to the interior surface 42 of second shell half 18 by L-shaped bracket 56. Illustratively, L-shaped bracket 56 is welded to the interior surface 42, and lock-engaging means 54 is welded to L-shaped bracket 56. Locking means 48 is disposed so that lock 52 extends generally transverse to the longitudinal axis A of the housing 10, and parallel to transverse axis B. An opening 58 in first shell half 16 is aligned with lock bracket 50 for permitting the bolt-type lock 52 to be inserted into the housing 10 to engage the lock-engaging means 54.

A second locking means 60 is provided in the interior of housing 10 near the end of housing 10 opposite from first locking means 48. Second locking means 60 includes a lock bracket 62 attached to the interior surface 42 of second shell half 18. Lock bracket 62 includes an aperture 64 for receiving a bolt-type lock 66. Bolt-type lock 66 is received by a lock-engaging means 68 which is connected by L-shaped bracket 70 to the interior surface 38 of first shell half 16. The second locking means 60 is also disposed so that bolt-type lock 66 extends generally parallel to the transverse axis B of housing 18. An opening 71 in the second shell half 18 is aligned with lock bracket 62 for permitting the bolt-type lock 66 to be inserted into the housing 10 to engage the lock-engaging means 68.

In operation, the first shell half 16 and second shell half 18 are fitted over valve 12 and line 14, and placed together such that the lip region 34 of second shell half 18 is inserted into the lip-receiving area of lip region 28 of first shell half 16, and the lip region 30 of first shell half 16 is inserted into the lip-receiving area of lip region 32 of second shell half 18. When the shell halves 16, 18 are mated, lock bracket 50 and lock-engaging means 54 of first locking means 48 are aligned, as are the lock bracket 62 and lock-engaging means 68 of second locking means 60. A bolt lock key (not shown) is inserted into bolt-type locks 52, 66 to retract lock balls 72 of locks 52, 66. Locks 52, 66 are then passed through openings 58, 71, through apertures 64 in lock brackets 50, 62, and inserted into lock-engaging means 54, 68, respectively. The bolt lock key (not shown) is then disengaged from locks 52, 66 to protract lock balls 72 into a gripping relation with radial ridges 74 in the interior of lock-engaging means 54, 68 to secure the locks 52, 66 to the lock-engaging means 54, 68. The engagement of locks 52, 66 in locking means 48, 60 locks the first shell half 16 securely to the second shell half 18.

What is claimed is:

1. A security device for enclosing a valve in a material supply line to prevent unauthorized access to the valve comprising first and second shell halves, each shell half including lip regions, the lip regions of the first shell half being mateable with the lip regions of the second shell half to form an enclosure for the valve, means providing openings through the enclosure for the line, the enclosure and the openings being sufficiently large to permit the enclosure to rotate freely relative to the valve and line, each shell half also including an interior surface and an exterior surface, and first and second locking means for locking the shell halves together, the first locking means including a first lock, a first lock-receiving bracket attached to the interior surface of the first shell half, the first lock-receiving bracket including an aperture for receiving the lock, a first lock-engaging means attached to the interior surface of the second shell half for engaging the first lock when received in the bracket, and means providing an access opening in the first shell half for inserting the first lock into the enclosure, the second locking means including a second lock, a second lock-receiving bracket attached to the interior of the second shell half, a second lock-engaging means attached to the interior of the first shell half, and means providing an access opening in the second shell half for inserting the second lock into the enclosure, the first and second lock-receiving brackets being aligned with the respective first and second lock-engaging means when the shell halves are mated to permit the first lock to be received by both the first lock-receiving bracket and the first lock-engaging means, and the second lock to be received by both the second lock-receiving bracket and the second lock-engaging means to lock the first shell half to the second shell half.

2. The invention of claim 1 wherein one of the lip regions of each shell half includes a flange providing a lip-receiving area for a lip region of the other shell half.

3. The invention of claim 2 wherein each shell half includes a generally elongated bowl-shaped member having a longitudinal axis and a pair of opposed, generally semicircular cut-out portions which form a pair of opposed openings in the enclosure when the shell halves are mated.

4. The invention of claim 1 wherein the first and second shell halves are mirror images of each other.

5. A security device for enclosing a valve in a line to prevent unauthorized access to the valve comprising first and second shell halves, each shell half comprising a bowl-shaped member elongated along a longitudinal axis generally parallel to said line to have an oval longitudinal cross section, the first and second shell halves being mateable to form an enclosure for the valve and to provide first and second openings through which the line can pass, the enclosure and the openings being sufficiently large to permit the enclosure to rotate freely relative to the valve and line, each shell half including perimetral lip regions for mating the first shell half to the second shell half, a lock-receiving bracket on the interior of the first shell half, a lock-engaging means on the interior of the second shell half, a bolt-type lock receivable by the lock-receiving bracket and engageable with the lock-engaging means for locking the first shell half to the second shell half, and means providing an access opening in the first shell half for inserting the lock into the enclosure.

6. The invention of claim 5 further comprising a second lock-receiving bracket on the interior of the second shell half, a second lock-engaging means on the interior of the first shell half, a second bolt-type lock receivable by the second lock-receiving bracket and engageable with the second lock-engaging means for locking the second shell half to the first shell half, and means providing a second access opening in the second shell half for inserting the second lock into the enclosure.

7. A security device for enclosing a valve in a material supply line to prevent unauthorized access to the valve comprising first and second housing members, each housing member including an edge portion mateable with an edge portion of the other housing member to form an enclosure for the valve, means providing opposed openings in the enclosure for the supply line, the enclosure and the opposed openings being sufficiently large to permit the enclosure to rotate freely relative to the valve and supply line, a lock mechanism, means for attaching the lock mechanism to the interior surface of one of the first and second housing members so that the lock mechanism is enclosed when the housing members are mated, and means providing an access opening in the other of the first and second housing members to allow authorized operation of the lock mechanism.

* * * * *